United States Patent
Hata (10) Patent No.: US 9,415,801 B2
(45) Date of Patent: Aug. 16, 2016

(54) POWER STEERING SYSTEM

(71) Applicant: JTEKT CORPORATION, Osaka-shi, Osaka (JP)

(72) Inventor: Hiroaki Hata, Kashiba (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 14/540,369

(22) Filed: Nov. 13, 2014

(65) Prior Publication Data

US 2015/0144417 A1    May 28, 2015

(30) Foreign Application Priority Data

Nov. 22, 2013 (JP) ................................. 2013-242096

(51) Int. Cl.
| | | |
|---|---|---|
| *B62D 5/06* | (2006.01) | |
| *B62D 5/04* | (2006.01) | |
| *B62D 5/065* | (2006.01) | |
| *B62D 5/14* | (2006.01) | |
| *B62D 5/22* | (2006.01) | |

(52) U.S. Cl.
CPC .............. *B62D 5/0469* (2013.01); *B62D 5/065* (2013.01); *B62D 5/14* (2013.01); *B62D 5/22* (2013.01)

(58) Field of Classification Search
CPC ....................................................... B62D 5/065
USPC ........................ 180/422, 421, 423, 441, 442
See application file for complete search history.

(56) References Cited

U.S. PATENT DOCUMENTS

| | | | | |
|---|---|---|---|---|
| 6,101,435 A | * | 8/2000 | Baughn ................. | B62D 5/065 180/422 |
| 6,250,417 B1 | * | 6/2001 | Kaji et al. ...................... | 180/421 |
| 6,318,495 B1 | * | 11/2001 | Obata ........................... | 180/422 |
| 7,591,174 B2 | * | 9/2009 | Matsuda ............. | B62D 15/022 73/117.02 |
| 2001/0004953 A1 | * | 6/2001 | Takai et al. .................... | 180/423 |
| 2003/0024758 A1 | * | 2/2003 | Fujita ............................ | 180/422 |
| 2003/0141138 A1 | * | 7/2003 | Shimizu et al. ............... | 180/422 |
| 2003/0141139 A1 | * | 7/2003 | Shimizu et al. ............... | 180/422 |
| 2003/0144781 A1 | * | 7/2003 | Shimizu et al. ................. | 701/41 |
| 2003/0144782 A1 | * | 7/2003 | Shimizu et al. ................. | 701/41 |
| 2005/0178607 A1 | * | 8/2005 | Kodama et al. ............... | 180/422 |
| 2007/0043490 A1 | * | 2/2007 | Yokota et al. .................... | 701/41 |
| 2009/0259367 A1 | * | 10/2009 | Choi ................... | B62D 5/0463 701/42 |
| 2009/0292420 A1 | * | 11/2009 | Choi ............................... | 701/41 |

(Continued)

FOREIGN PATENT DOCUMENTS

| | | |
|---|---|---|
| EP | 2527230 A1 | 11/2012 |
| JP | A-11-321674 | 11/1999 |

OTHER PUBLICATIONS

Jun. 3, 2016 Search Report issued in European Patent Application No. 14193850.6.

*Primary Examiner* — Joseph Rocca
*Assistant Examiner* — Conan Duda
(74) *Attorney, Agent, or Firm* — Oliff PLLC (57) ABSTRACT

In a power steering system, when power is on, a normal mode process is executed and a target rotational speed is set based on a rotational speed map for a normal mode. When the normal mode process is being executed, if a first mode switching condition that a detected vehicle speed is equal to or lower than a prescribed value, the absolute value of a detected steering angle is equal to or greater than a prescribed value, and the absolute value of a detected steering, angular velocity is equal to or less than a prescribed value is satisfied, the target rotational speed is set based on a rotational speed map for a rack end mode.

4 Claims, 9 Drawing Sheets

(56) References Cited

U.S. PATENT DOCUMENTS

| | | | | |
|---|---|---|---|---|
| 2010/0001680 A1* | 1/2010 | Sasaki | ............... | B62D 5/046 318/675 |
| 2011/0150672 A1* | 6/2011 | Kimura et al. | ............... | 417/305 |
| 2012/0290175 A1* | 11/2012 | Hisanaga | ............... | 701/41 |
| 2013/0037341 A1* | 2/2013 | Sakamaki | ............... | 180/422 |
| 2013/0079992 A1* | 3/2013 | Nakajima | ............... | 701/42 |
| 2013/0268161 A1* | 10/2013 | Izutani | ............... | 701/42 |

* cited by examiner

| MOTOR ROTATIONAL SPEED (rpm) | ABSOLUTE VALUE OF STEERING ANGLE (deg) | | | | | | |
|---|---|---|---|---|---|---|---|
| | 400 | 450 | 500 | 550 | 600 | 650 | 700 |
| | 2800 | 2500 | 2000 | 1700 | 1500 | 1500 | 1500 |

| | ABSOLUTE VALUE OF STEERING ANGULAR VELOCITY (deg/s) | | | | | | | |
|---|---|---|---|---|---|---|---|---|
| | 0 | 10 | 25 | 50 | 100 | 200 | 400 |
| 400 | 1800 | 1800 | 2500 | 3000 | 3600 | 3800 | 4300 |
| 450 | 1600 | 1900 | 2500 | 3000 | 3600 | 3800 | 4000 |
| 500 | 1600 | 1900 | 2500 | 3000 | 3600 | 3800 | 4000 |
| 550 | 1600 | 1800 | 2500 | 3000 | 3600 | 3800 | 4000 |
| 600 | 1600 | 1800 | 2500 | 3000 | 3600 | 3800 | 4000 |
| 650 | 1600 | 1800 | 2500 | 3000 | 3600 | 3800 | 4000 |
| 700 | 1600 | 1800 | 2500 | 3000 | 3600 | 3800 | 4000 |

ABSOLUTE VALUE OF STEERING ANGLE (deg)

POWER STEERING SYSTEM

INCORPORATION BY REFERENCE

The disclosure of Japanese Patent Application No. 2013-242096 filed on Nov. 22, 2013 including the specification, drawings and abstract, is incorporated herein by reference in its entirety.

BACKGROUND OF THE INVENTION

1. Field of the Invention

The invention relates to a power steering system.

2. Description of the Related Art

There is a conventional power steering system that supports an operation of a steering wheel by supplying hydraulic fluid from a hydraulic pump to a power cylinder connected to a steering mechanism, such as a rack-and-pinion mechanism (refer to for example, Japanese Patent Application Publication No. 11-321674 (JP 11-321674 A)).

In such a power steering system, an electric motor such as a three-phase brushless motor may be used as a drive source for the hydraulic pump. In this case, driving, electric power to be supplied to the electric motor is controlled such that the electric motor is rotated at a target rotational speed based on a steering angular velocity of the steering wheel.

In the conventional power steering system, if the steering angular velocity increases while the steering wheel is being returned from a steering angle that is formed when a rack is positioned near a rack end, the target rotational speed for the electric motor changes to a larger value as the steering angular velocity increases. This increases the rotational speed of the electric motor, causing an increase in the degree of overshoot. As a result, operating noise of the hydraulic pump increases.

SUMMARY OF THE INVENTION

One object of the invention is to provide a power steering system configured to reduce operating noise of a hydraulic pump at the time when a rack is positioned near a rack end.

A power steering system according to an aspect of the invention includes: an electric motor; a hydraulic pump that is driven by the electric motor to generate steering assist force; and a controller that controls the electric motor. The controller includes: a first controller that controls a rotational speed of the electric motor based on a steering angular velocity and a vehicle speed; a second controller that controls the rotational speed of the electric motor based on a steering angle; and a switching unit that switches a control mode from rotational speed control by the first controller to rotational speed control by the second controller when the vehicle speed is equal to or lower than a first threshold and an absolute value of the steering angle is equal to or greater than a second threshold.

In the power steering system according to the above aspect, the control mode is switched from the rotational speed control executed by the first controller based on the steering angular velocity and the vehicle speed to the rotational speed control executed by the second controller based on the steering angle when the vehicle speed is equal to or lower than the first threshold and the absolute value of the steering angle is equal to or greater than the second threshold. Thus, when the steering angle is an angle formed when a rack is close to a rack end, a target rotational speed for the electric motor is set to a value lower than that in the case where the rotational speed control is executed by the first controller. Therefore, even when the steering angular velocity increases while a steering wheel is being returned from a steering angle that is formed when the rack is positioned near the rack end, it is possible to restrain the target rotational speed for the electric motor from abruptly changing to a large value. Thus, it is possible to suppress an increase in the degree of overshoot. As a result, it is possible to reduce operating noise of the hydraulic pump at the time when the rack is positioned near the rack end.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
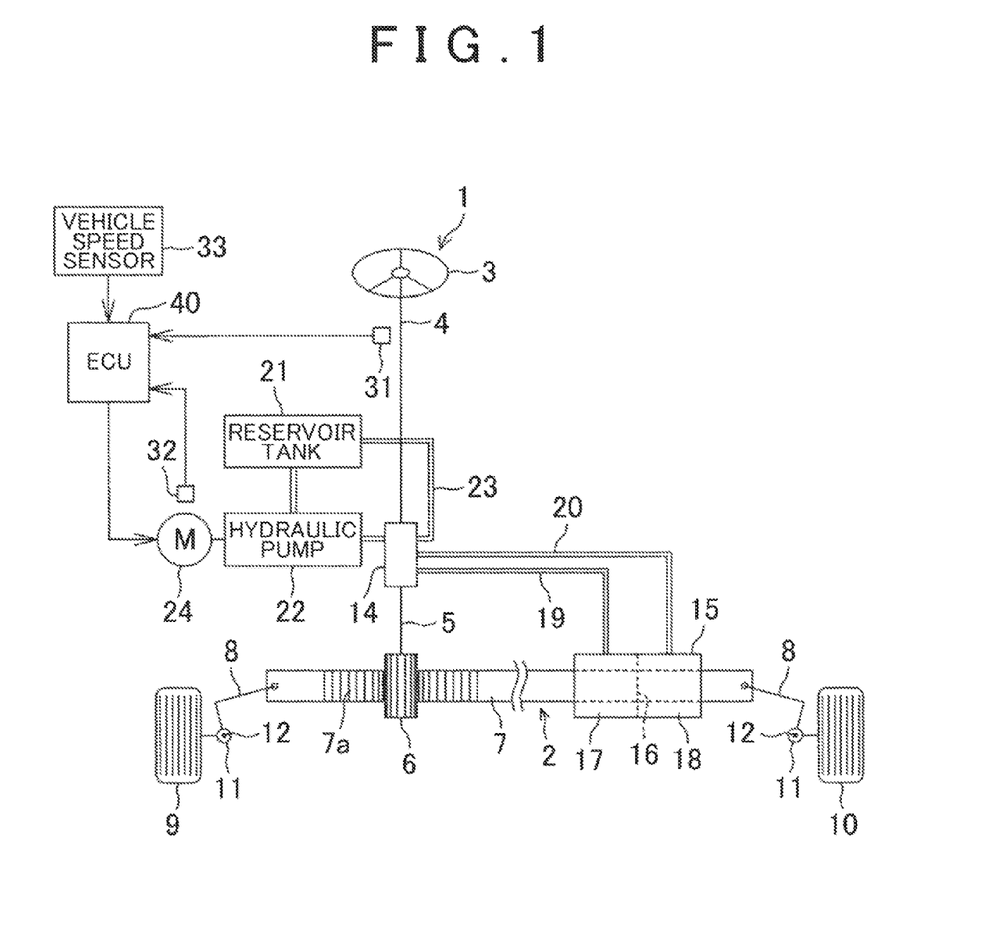
FIG. 1 is a schematic diagram illustrating the schematic configuration of a power steering system according to an embodiment of the invention.

Hereinafter, example embodiments of the invention will be described in detail with reference to the accompanying drawings. FIG. 1 is a schematic diagram illustrating the schematic configuration of a power steering system 1 according to an embodiment of the invention. The power steering system 1 is provided for a steering mechanism 2 of a vehicle, and applies steering assist force to the steering mechanism 2. The steering mechanism 2 includes a steering wheel 3, which serves as an operation member that is operated by a driver to steer the vehicle, a steering shaft 4 that is connected to the steering wheel 3, a pinion shaft 5 that is connected to the distal end portion of the steering shaft 4 via a hydraulic control valve 14 and that has a pinion gear 6, and a rack shaft 7 that has a rack 7a meshed with the pinion gear 6 and that serves as a steered shaft extending in the lateral direction of the vehicle.

Tie rods 8 are respectively connected to opposite ends of the rack shaft 7, and the tie rods 8 are connected to knuckle arms 11 that support right and left steered wheels 10, 9. The knuckle arms 11 are provided so as to be pivotable about kingpins 12. When the steering wheel 3 is operated and thus the steering shaft 4 is rotated, the rotation is converted into a linear motion along the axial direction of the rack shaft 7 by the pinion gear 6 and the rack 7a. The linear motion is converted into pivot motions of the knuckle arms 11 about the kingpins 12, and thus, the right and left steered wheels 10, 9 are steered.

The hydraulic control valve 14 is a rotary valve, and has a sleeve valve body (not illustrated) connected to the steering shaft 4, a shaft valve body (not illustrated) connected to the pinion shaft 5, and a torsion bar (not illustrated) that connects the sleeve valve body and the shaft valve body to each other. The torsion bar is twisted based on the direction and magnitude of steering torque applied to the steering wheel 3, and the opening degree of the hydraulic control valve 14 changes based on the direction and magnitude of twisting of the torsion bar.

The hydraulic control valve 14 is connected to a power cylinder 15 that applies steering assist force to the steering mechanism 2. The power cylinder 15 has a piston 16 provided integrally with the rack shaft 7, and a pair of cylinder chambers 17, 1$ defined by the piston 16. The cylinder chambers 17, 18 are connected to the hydraulic control valve 14 through oil passages 19, 20, respectively.

The hydraulic control valve 14 is disposed on an intermediate portion of an oil circulation passage 23 that passes through a reservoir tank 21 and a hydraulic pump 22 that generates steering assist force. The hydraulic pump 22 is, for example, a gear pump, and is driven by the electric motor 24 to draw hydraulic fluid stored in the reservoir tank 21 and supply the hydraulic fluid to the hydraulic control valve 14. Excess hydraulic fluid is returned from the hydraulic control valve 14 to the reservoir tank 21 through the oil circulation passage 23.

The electric motor 24 is driven to be rotated in one direction to drive the hydraulic pump 22. Specifically, the electric motor 24 has an output shaft connected to the input shaft of the hydraulic pump 22. The output shaft of the electric motor 24 rotates, so that the input shaft of the hydraulic pump 22 rotates and thus the hydraulic pump 22 is driven. When the torsion bar is twisted in one direction, the hydraulic control valve 14 supplies the hydraulic fluid to one of the cylinder chambers 17, 18 of the power cylinder 15 through a corresponding one of the oil passages 19, 20 and returns the hydraulic fluid in the other one of the cylinder chambers 17, 18 to the reservoir tank 21. When the torsion bar is twisted in the other direction, the hydraulic control valve 14 supplies the hydraulic fluid to the other one of the cylinder chambers 17, 18 through the other one of the oil passages 19, 20, and returns the hydraulic fluid in the one of the cylinder chambers 17, 18 to the reservoir tank 21.

When the torsion bar is scarcely twisted, the hydraulic control valve 14 is in a so-called equilibrium state, the steering wheel 3 is at the neutral position, the pressures in the cylinder chambers 17, 18 of the power cylinder 15 are maintained equal to each other, and hydraulic fluid circulates through the oil circulation passage 23. If the sleeve valve body and the shaft valve body of the hydraulic control valve 14 are rotated relative to each other due to steering, the hydraulic fluid is supplied to one of the cylinder chambers 17, 18 of the power cylinder 15, and the piston 16 moves along the vehicle-width direction (the lateral direction of the vehicle). Thus, steering assist force is applied to the rack shaft 7.

The electric motor 24 is a three-phase brushless motor, and is controlled by an electronic controller (ECU) 40 that serves as a motor controller. A steering angle sensor 31, a rotation angle sensor 32, and a vehicle speed sensor 33 are connected to the ECU 40. The steering angle sensor 31 detects a steering angle θh of the steering wheel 3 operated by a driver. In the present embodiment, the steering angle sensor 31 detects a degree of rotation (rotation angle) in each of the forward direction and reverse direction of the steering shaft 4 from the neutral position of the steering shaft 4. The steering angle sensor 31 outputs the degree of rotation clockwise from the neutral position as, for example, a positive value, and outputs the degree of rotation counterclockwise from the neutral position as, for example, a negative value.

Figure 2:
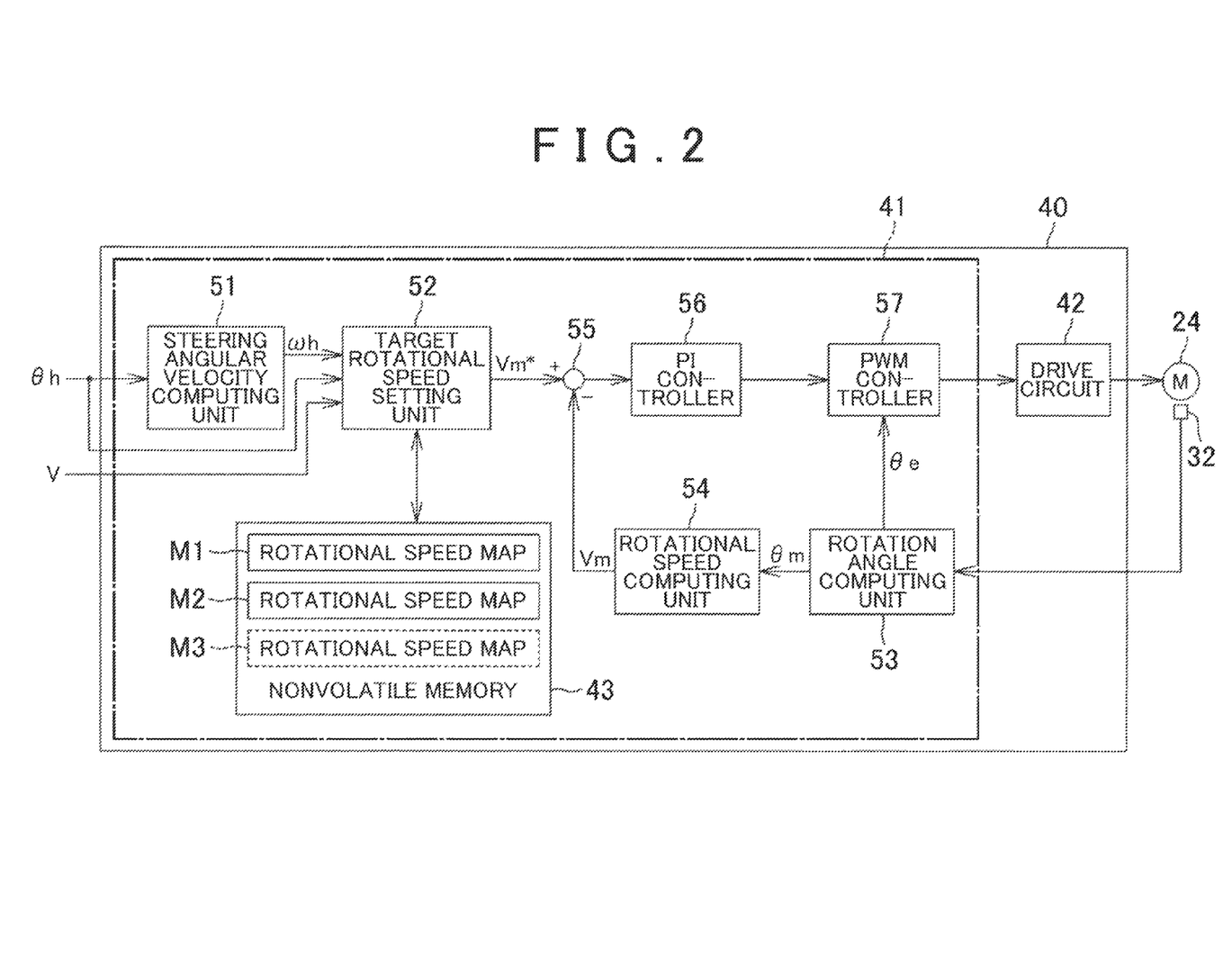
FIG. 2 is a schematic diagram illustrating the electrical configuration of an ECU.

The rotation angle sensor 32 detects a rotation angle of a rotor of the electric motor 24, and is, for example, a resolver. The vehicle speed sensor 33 detects a speed of the vehicle. FIG. 2 is a schematic diagram illustrating the electrical configuration of the ECU 40. The ECU 40 includes a microcomputer 41, and a drive circuit (inverter circuit) 42 that supplies electric power to the electric motor 24 under the control of the microcomputer 41.

The microcomputer 41 includes, for example, a CPU and memories (e.g. a ROM, a RAM, a nonvolatile memory 43), and executes prescribed programs to function as a plurality of function processing units. The function processing units include a steering angular velocity computing unit 51, a target rotational speed setting unit 52, a rotation angle computing unit 53, a rotational speed computing unit 54, a speed deviation computing unit 55, a PI controller 56, and a PWM controller 57.

The steering angular velocity computing unit 51 differentiates the output value of the steering angle sensor 31 with respect to time to compute a steering angular velocity ωh. The steering angular velocity computing unit 51 may be provided in a vehicle-side ECU. The target rotational speed setting unit 52 sets a target rotational speed Vm* that is a target value of the rotational speed of the electric motor 24 (=the rotational speed of the hydraulic pump 22). In the present embodiment, a motor control mode includes a normal mode and a rack end mode, and a method of setting the target rotational speed Vm* varies between the normal mode and the rack end mode. The rack end mode is a control mode that is adopted in a case where the steering angle is an angle formed when the rack 7a is positioned near a rack end and a prescribed condition is satisfied. In the present embodiment, the prescribed condition is a condition that the vehicle speed is equal to or lower than a prescribed speed and the absolute value of the steering angular velocity is equal to or less than a prescribed value.

In the normal mode, the target rotational speed setting unit 52 sets the target rotational speed Vm* based on the steering angular velocity (detected steering angular velocity) ωh computed by the steering angular velocity computing unit 51 and the vehicle speed detected vehicle speed) V detected by the vehicle speed sensor 33. More specifically, in the normal mode, the target rotational speed setting unit 52 sets the target rotational speed Vm* corresponding to the detected steering, angular velocity ωh and the detected vehicle speed V, using a map in which the target rotational speed Vm* with respect to the steering angular velocity ωh and the vehicle speed V is stored (hereinafter, referred to as "rotational speed map M1 for the normal mode"). The rotational speed map M1 for the normal mode is stored in the nonvolatile memory 43.

Figure 3:
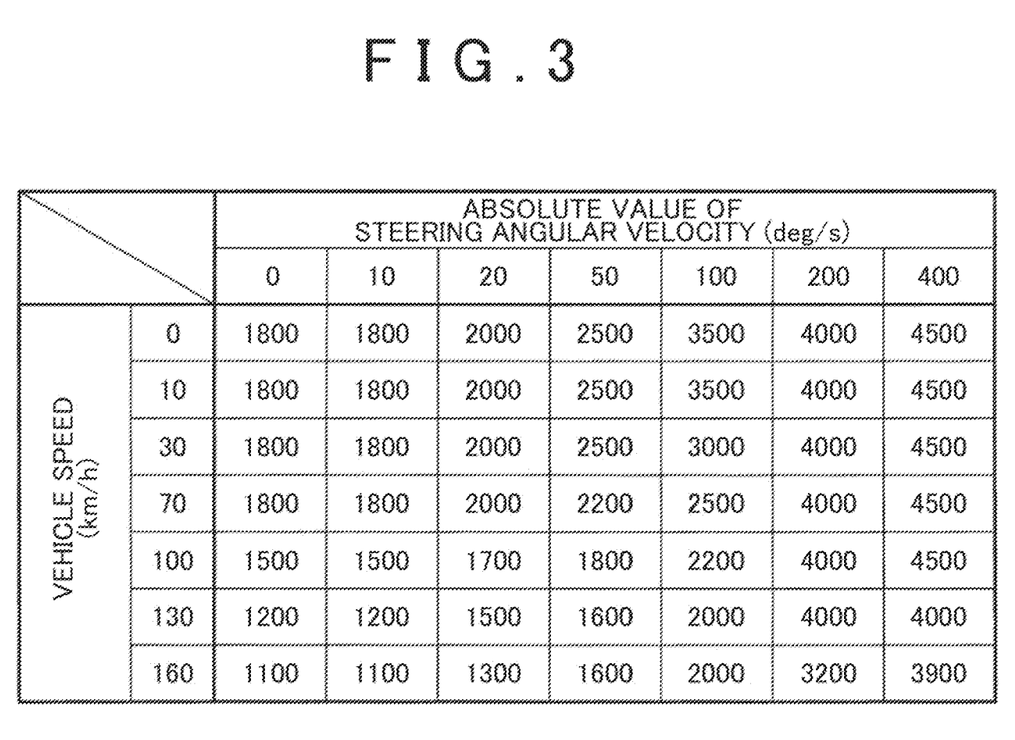
FIG. 3 is a table illustrating an example of the content of a rotational speed map M1 for a normal mode.

FIG. 3 is a table illustrating an example of the content of the rotational speed map M1 for the normal mode. The unit of the target rotational speed Vm* is revolutions per minute (rpm). The target rotational speeds Vm* between adjacent columns and between adjacent rows in FIG. 3 are obtained by linear interpolation. As can be understood from FIG. 3, in the normal mode, in principle, as the absolute value of the detected steering angular velocity ωh becomes larger, the target rotational speed Vm* is set to a larger value, and as the detected vehicle speed V becomes higher, the target rotational speed Vm* is set to a lower value.

In the rack end mode, the target rotational speed setting unit 52 sets the target rotational speed Vm* based on the steering angle (detected steering angle) θh detected by the steering angle sensor 31. More specifically, in the rack end mode, the target rotational speed setting unit 52 sets the target rotational speed Vm* corresponding to the detected steering angle θh, using a map in which the target rotational speed Vm* with respect to the steering angle θh is stored thereinafter, referred to as "rotational speed map M2 for the rack end mode"). The rotational speed map M2 for the rack end mode is stored in the nonvolatile memory 43.

Figure 4:
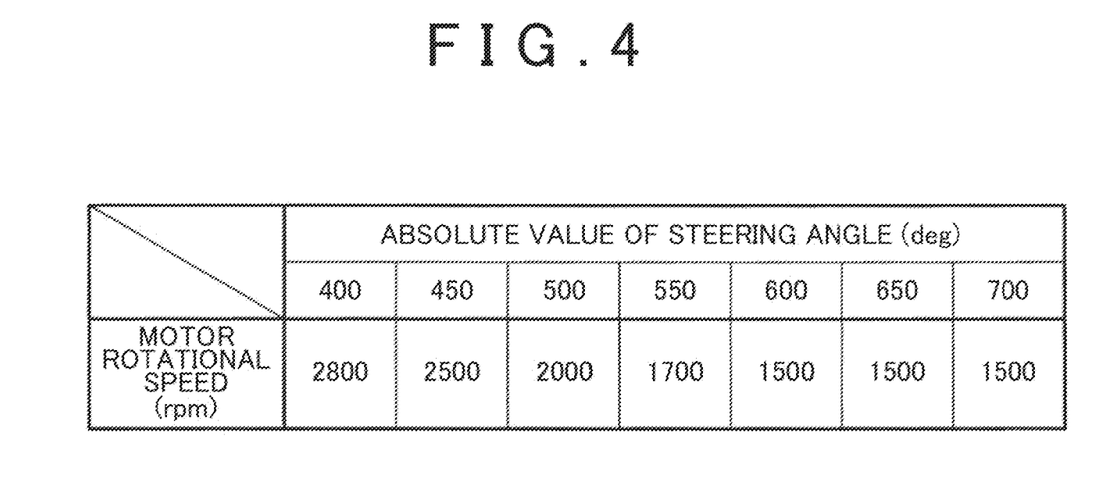
FIG. 4 is a table illustrating an example of the content of a rotational speed map M2 for a rack end mode.

FIG. 4 is a table illustrating an example of the content of the rotational speed map M2 for the rack end mode. The unit of the target rotational speed Vm* is rpm. The target rotational speeds Vm* between adjacent columns in FIG. 4 are obtained by linear interpolation. As can be understood front FIG. 4, in the rack end mode, in principle, as the absolute value of the detected steering angle θh becomes larger, the target rotational speed Vm* is set to a lower value. In the rack end mode, when the steering angle is an angle formed when the rack 7a is closer to the rack end, the target rotational speed Vm* is set to a value lower than that in the normal mode.

Therefore, even when the steering angular velocity abruptly increases while the steering wheel 3 is being returned from a steering angle that is formed when the rack 7a is positioned near the rack end, it is possible to restrain the target rotational speed for the electric motor 24 from abruptly changing to a large value. Thus, it is possible to suppress an increase in the degree of overshoot. As a result, it is possible to reduce operating noise of the hydraulic pump 22 at the time when the rack 7a is positioned near the rack end. The rotation angle computing unit 53 computes the rotation angles θe, θm of the rotor of the electric, motor 24 based on an output signal from the rotation angle sensor 32. The rotational angle θe is an electrical angle, and the rotational angle θm is a mechanical angle. The rotor rotation angle θe computed by the rotation angle computing unit 53 is provided to the PWM controller 57. The rotor rotation angle θm computed by the rotation angle computing unit 53 is provided to the rotational speed computing unit 54. The rotational speed computing unit 54 differentiates the rotor rotation angle θm computed by the rotation angle computing unit 53 with respect to time, thereby computing a rotational speed Vm of the electric motor 24.

The speed deviation computing unit 55 computes a deviation ΔVm (=Vm*−Vm) between the target rotational speed Vm* set by the target rotational speed setting unit 52 and the rotational speed Vm of the electric motor 24 computed by the rotational speed computing unit 54. The PI controller 56 executes PI computation on the rotational speed deviation ΔVm computed b the speed deviation computing unit 55. That is, the speed deviation computing unit 55 and the PI controller 56 constitute a speed feedback controller that causes the rotational speed Yin of the electric motor 24 to follow the target rotational speed Vm*. The PI controller 56 executes PI computation on the rotational speed deviation ΔVm, thereby computing a control voltage value, which is a value of control voltage to be applied to the electric motor 24.

Figure 5:
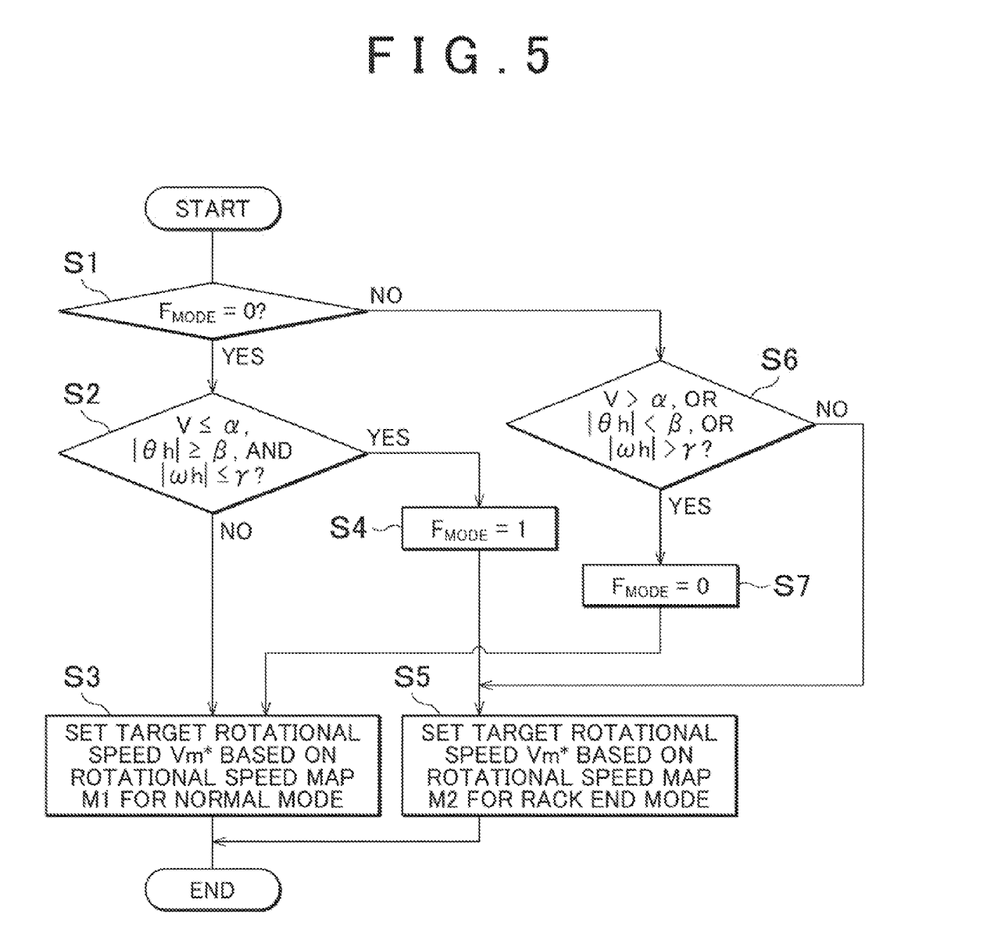
FIG. 5 is a flowchart illustrating an example of the operation if a target rotational speed setting unit.

The PWM controller 57 generates a drive signal based on the control voltage value computed by the PI controller 56 and the rotor rotation angle θe computed by the rotation angle computing unit 53, and provides the drive signal to the drive circuit 42. Thus, a voltage corresponding to the control voltage value computed by the PI controller 56 is applied from the drive circuit 42 to the electric motor 24. FIG. 5 is a flowchart illustrating an example of the operation of the target rotational speed setting unit 52. The process in FIG. 5 is repeatedly executed with a prescribed computation period.

The target rotational speed setting unit 52 determines whether the value of a mode flag FMODE is zero (step S1). As described above, the motor control mode includes the normal mode and the rack end mode. The mode flag FMODE is a flag for storing the presently-set control mode. When the presently-set control mode is the normal mode, the value of the mode flag FMODE is set to zero. When the presently-set control mode is the rack end mode, the value of the mode flag FMODE is set to one. The initial value of the mode flag FMODE is zero.

When the value of the mode flag FMODE is zero, that is, when the control mode is the normal mode (step S1: YES), the target rotational speed setting unit 52 determines whether a first mode switching condition is satisfied (step S2). The first mode switching condition is the condition that the detected vehicle speed V is equal to or lower than a prescribed value α (α>0), the absolute value |θh| of the detected steering angle is equal to or greater than a prescribed value β (β>0), and the absolute value |ωh| of the detected steering angular velocity is equal to or less than a prescribed value γ (γ>0). The prescribed value α is set to, for example, a speed within a range of 1 km per hour (km/h) to 10 km/h. The prescribed value β is set to, for example, an angle within a range of 400 degrees to the degree of the maximum steering angle. The prescribed value γ is set to, for example, a steering angular velocity within a range of 150 degrees per second (deg/s) to 300 deg/s.

When it is determined in step S2 that the first mode switching condition is not satisfied (step S2: NO), the target rotational speed setting unit 52 sets the target rotational speed Vm* based on the rotational speed map M1 for the normal mode (see FIG. 3) (step S3). That is, the target rotational speed setting unit 52 sets the target rotational speed Vm* corresponding to the detected steering angular velocity ωh and the detected vehicle speed V, using the rotational speed map M1 for the normal mode. Then, the process in the present computation period ends.

When it is determined in step S2 that the first mode switching condition is satisfied (step S2: YES), the target rotational speed setting unit 52 sets the value of the mode flag, FMODE to one to switch the control mode from the normal mode to the rack end mode (step S4). Then, the target rotational speed setting unit 52 sets the target rotational speed Vm* based on the rotational speed map M2 for the rack end mode (see FIG. 4) (step S5). That is, the target rotational speed setting unit 52 sets the target rotational speed Vm* corresponding to the detected steering angle θh, using the rotational speed map M2 for the rack end mode. Then, the process in the present computation period ends.

When it is determined in step S1 that the value of the mode flag FMODE is one, that is, when it is determined that the control mode is the rack end mode (step S1: NO), the target rotational speed setting unit 52 determines whether a second mode switching condition is satisfied (step S6). The second mode switching condition is the condition that the detected vehicle speed V is higher than the prescribed value α, the absolute value |θh| of the detected steering angle is less than the prescribed value β, or the absolute value |ωh| of the detected steering, angular velocity is greater than the prescribed value γ.

When it is determined in step S6 that the second mode switching condition is not satisfied (step S6: NO), the target rotational speed setting unit 52 sets the target rotational speed Vm* based on the rotational speed map M2 for the rack end mode (see FIG. 4) (step S5). Then, the process in the present computation period ends. When it is determined in step S6 that the second mode switching condition is satisfied (step S6: YES), the target rotational speed setting unit 52 sets the value of the mode flag FMODE to zero to switch the control mode from the rack end mode to the normal mode (step S7). Then, the target rotational speed setting unit 52 sets the target rotational speed Vm* based on the rotational speed map M1 for the normal mode (see FIG. 3) (step S3). Then, the process in the present computation period ends.

When power is on, the processes in steps S1, S2, S3 (normal mode process) are executed, so that the target rotational speed Vm* is set based on the rotational speed map M1 for the normal mode. When the normal mode process is being executed, if the first mode switching condition is satisfied, an affirmative determination is made in step S2. Thus, the value of the mode flag FMODE is set to one in step S4, and then the target rotational speed setting unit 52 proceeds on to step S5 in which the target rotational speed Vm* is set based on the rotational speed map M2 for the rack end mode. Then, the processes in steps S1, S6, S5 (rack end mode process) are executed.

When the rack end mode process is being executed, if the second mode switching condition is satisfied, an affirmative determination is made in step S6. The value of the mode flag FMODE is set to zero in step S7, and then the target rotational speed setting unit 52 proceeds on to step S3 in which the target rotational speed Vm* is set based on the rotational speed map M1 for the normal mode. Then, the processes in steps S1, S2, S3 (normal mode process) are executed.

The first mode switching condition used in step S2 in FIG. 5 may be the condition that the detected vehicle speed V is equal to or lower than the prescribed value $\alpha$ ($\alpha>0$) and the absolute value $|\theta h|$ of the detected steering angle is equal to or greater than the prescribed value $\beta$ ($\beta>0$). In this case, the second mode switching condition used in step S6 in FIG. 5 is the condition that the detected vehicle speed V is higher than the prescribed value $\alpha$ or the absolute value $|\theta h|$ of the detected steering angle is less than the prescribed value $\beta$.

Figure 6:
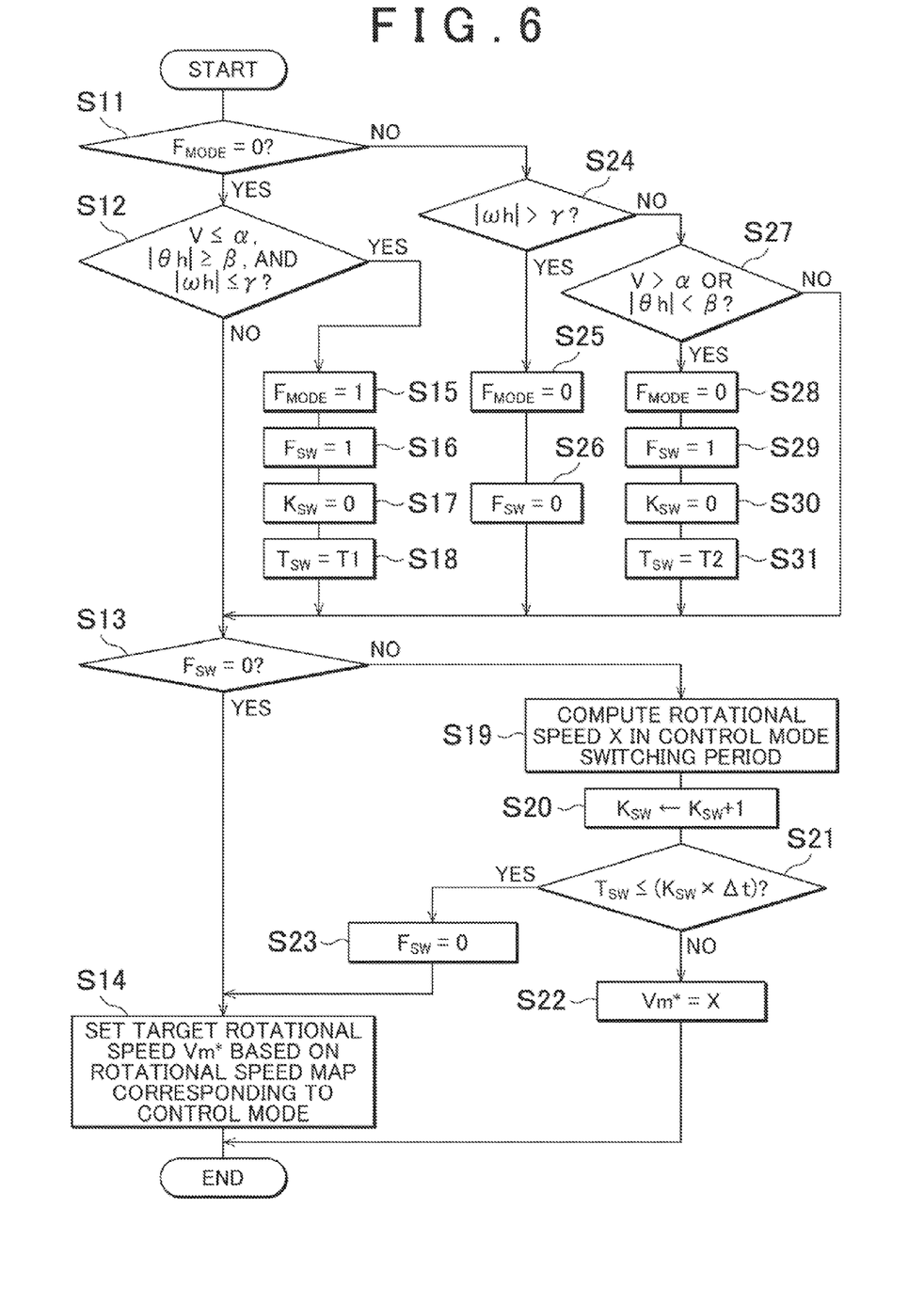
FIG. 6 is a flowchart illustrating another example of the operation of the target rotational speed setting unit.

FIG. 6 is a flowchart illustrating another example of the operation of the target rotational speed setting unit 52. The process in FIG. 6 is repeatedly executed with a prescribed computation period. In the operation example in FIG. 5 described above, when the control mode is switched, the rotational speed map used to set the target rotational speed is immediately switched. The operation example in FIG. 6 is different from the operation example in FIG. 5 in that a control mode switching period is set at the time of switching of the control mode in principle and a process for gradually bringing the target rotational speed closer to the target rotational speed after switching of the control mode is executed in the control mode switching period.

The target rotational speed setting unit 52 determines whether the value of a mode flag FMODE is zero (step S11). The mode flag FMODE is a flag for storing the presently-set control mode. When the presently-set control mode is the normal mode, the value of the mode flag FMODE is set to zero. When the presently-set control mode is the rack end mode, the value of the mode flag FMODE is set to one. The initial value of the mode flag FMODE is zero.

When it is determined in step S11 that the value of the mode flag FMODE is zero, that is, when the control mode is the normal mode (step S11: YES), the target rotational speed setting unit 52 determines whether a first mode switching condition is satisfied (step S12). The first mode switching condition is the condition that the detected vehicle speed V is equal to or lower than a prescribed value $\alpha$ ($\alpha>0$), the absolute value $|\theta h|$ of the detected steering angle is equal to or greater than a prescribed value $\beta$ ($\beta>0$), and the absolute value $|\omega h|$ of the detected steering angular velocity is equal to or less than a prescribed value $\gamma$ ($\gamma>0$).

When it is determined in step S12 that the first mode switching condition is not satisfied (step S12: NO), the target rotational speed setting unit 52 determines whether a switching period flag FSW is reset (FSW=0) (Step S13). The switching period flag FSW is a flag for storing the information as to whether the present time is in the control mode switching period. When the present time is not in the control mode switching period, the switching period flag FSW is reset (FSW=0). When the present time is in the control mode switching period, the switching period flag FSW is set (FSW=1). The switching period flag FSW is reset in the initial state.

When the switching period flag FSW is reset (FSW=0) (step S13: YES), the target rotational speed setting unit 52 proceeds on to step S14. In step S14, the target rotational speed setting unit 52 sets the target rotational speed Vm* using the rotational speed map corresponding to the presently-set control mode. Specifically, when the value of the mode flag FMODE is zero (normal mode), the target rotational speed setting unit 52 sets the target rotational speed Vm* based on the rotational speed map M1 for the normal mode (see FIG. 3). The target rotational speed setting unit 52 sets the target rotational speed VIII* corresponding to the detected steering angular velocity $\omega h$ and the detected vehicle speed V, using the rotational speed map M1 for the normal mode.

When the value of the mode flag FMODE is one (rack end mode), the target rotational speed setting unit 52 sets the target rotational speed Vm* based on the rotational speed map M2 for the rack end mode (see FIG. 4). That is, the target rotational speed setting unit 52 sets the target rotational speed Vm* corresponding to the detected steering angle $\theta h$, using the rotational speed map M2 for the rack end mode. After the process in step S14 is executed, the target rotational speed setting unit 52 ends the process in the present computation period.

When it is determined in step S12 that the first mode switching condition is satisfied (step S12: YES), the target rotational speed setting unit 52 sets the value of the mode flag FMODE to one to switch the control mode from the normal mode to the rack end mode (step S15). The target rotational speed setting unit 52 sets the switching period flag FSW (FSW=1) (step S16). The target rotational speed setting unit 52 sets a variable KSW, which is used as an elapsed time measurement counter for measuring an elapsed time in the control mode switching period, to zero (step S17). The target rotational speed setting unit 52 sets a first prescribed time T1 as a variable TSW for storing the control mode switching period (step S18). The first prescribed time T1 is set to, for example, a time within a range of 100 milliseconds (msec) to 1000 msec. Then, the target rotational speed setting unit 52 proceeds on to step S13 to determine whether the switching period flag FSW is reset (FSW=0).

In this case, because the switching period flag FSW is set (FSW=1), the target rotational speed setting unit 52 proceeds from step S13 to step S19. In step S19, the target rotational speed setting unit 52 computes a target rotational speed X in the control mode switching period. When a presently-set target rotational speed is A, a target rotational speed after switching of the control mode is B, a computation period is $\Delta t$ (msec), and a remaining time of the control mode switching period is Trest (=TSW−KSW·$\Delta t$) (msec), the target rotational speed X in the control mode switching period is computed according to Expression (1). It should be noted that KSW·$\Delta t$ is the elapsed time after the control mode switching period starts.

$$X=A-[\{(A-B)/\text{Trest}\}\times\Delta t] \quad (1)$$

When the Control mode after switching of the Control mode is the rack end mode, the target rotational speed B after switching of the control mode is obtained based on the rotational speed map M2 for the rack end mode and the detected steering angle $\theta h$. When the control mode after switching of the control mode is the normal mode, the target rotational speed B after switching of the control mode is obtained based on the rotational speed map M1 for the normal mode, the detected steering angular velocity ωh, and the detected vehicle speed V.

For example, when the remaining time Trest of the control mode switching period is 500 msec, the computation period Δt is eight msec, the presently-set target rotational speed A is 4000 rpm, and the target rotational speed B after switching of the control mode is 1600 rpm, the target rotational speed X in the control mode switching period is 3961.6 rpm. Next, the target rotational speed setting unit 52 increments the count value KSW of the elapsed time measurement counter by one (step S20). Then, the target rotational speed setting unit 52 determines whether the elapsed time KSW·Δt after the start of the control mode switching period is equal to or longer than the set value TSW of the control mode switching period (step S21). When the elapsed time KSW·Δt is shorter than the set value TSW of the control mode switching period (step S21: NO), the target rotational speed setting unit 52 determines that the control mode switching period has not ended and sets the target rotational speed X in the control mode switching period computed in step S19 as the target rotational speed Vm* (step S22). Then, the process in the present computation period ends.

When it is determined in step S21 that the elapsed time KSW·Δt is equal to or longer than the set value TSW of the control mode switching period (step S21: YES), the target rotational speed setting unit 52 determines that the control mode switching period has ended and resets the switching period flag FSW (FSW=0) (step S23). Then, the target rotational speed setting unit 52 proceeds on to step S14 to set the target rotational speed Vm* based on the rotational speed map corresponding to the presently-set control mode. Then, the process in the present computation period ends.

When it is determined in step S11 that the value of the mode flag FMODE is one, that is, when it is determined that the control mode is the rack end mode (step S11: NO), the target rotational speed setting unit 52 determines whether a third mode switching condition that the absolute value |ωh| of the detected steering angular velocity is greater than the prescribed value γ is satisfied (step S24). When the third mode switching condition is not satisfied (step S24: NO), the target rotational speed setting unit 52 determines whether a fourth mode switching condition that the detected vehicle speed V is higher than the prescribed value α or the absolute value |θh| of the detected steering angle is less than the prescribed value β is satisfied (step S27). When the fourth mode switching condition is not satisfied (step S27: NO), the target rotational speed setting unit 52 proceeds on to step S13.

When it is determined in step S24 that the third mode switching condition is satisfied (step S24: YES), the target rotational speed setting unit 52 sets the value of the mode flag FMODE to zero to switch the control mode to the normal mode (step S25). When the third mode switching condition is satisfied, the absolute value of the steering angular velocity is great, and therefore it is assumed that a large steering assist force is required. Thus, in order to immediately switch the control mode to the normal mode, the target rotational speed setting unit 52 resets the switching period flag FSW (FSW=0) (step S26). Then, the target rotational speed setting unit S2 proceeds on to step S13. In this case, because an affirmative determination is made in step S13, the target rotational speed setting unit 52 proceeds on to step S14 in which the target rotational speed Vm* is set based on the rotational speed map M1 for the normal mode.

When it is determined in step S27 that the fourth mode switching condition is satisfied (step S27: YES), the target rotational speed setting unit 52 sets the value of the mode flag FMODE to zero to switch the control mode from the rack end mode to the normal mode (step S28). The target rotational speed setting unit 52 sets the switching period flag FSW (FSW=1) (step S29). The target rotational speed setting unit 52 sets the variable KSW, which is used as the elapsed time measurement counter for measuring the elapsed time in the control mode switching period, to zero (step S30). The target rotational speed setting unit 52 sets a second prescribed time T2 as the variable TSW for storing the control mode switching period (step S31). The second prescribed time T2 is set to, for example, a time within a range of 500 msec to 1000 msec. Then, the target rotational speed setting unit 52 proceeds on to step S13 to determine whether the switching period flag FSW is reset (FSW=0). In this case, because the switching period flag FSW is set (FSW=1), the target rotational speed setting unit 52 proceeds from step S13 to step S19.

When power is on, the processes in steps S11, S12, S13, S14 (normal mode process) are executed, so that the target rotational speed Vm* is set based on the rotational speed map M1 for the normal mode. When the normal mode process is being executed, if the first mode switching condition is satisfied, an affirmative determination is made in step S12. Therefore, the processes in steps S15 to S18 are executed, and then the target rotational speed setting unit 52 proceeds on to step S13. In this case, because a negative determination is made in step S13, the processes in steps S19 to S22 are executed. Thus, the target rotational speed X in the control mode switching period computed in step S19 is set as the target rotational speed Vm*. Then, if neither the third mode switching condition nor the fourth mode switching condition is satisfied by the end of the control mode switching period, the processes in steps S11, S24, S27, S13, and S19 to S22 are executed until the control mode switching period ends.

When the control mode switching period ends, an affirmative determination is made in step S21. Thus, the target rotational speed setting unit 52 proceeds from step S23 to step S14 in which the target rotational speed Vm* is set based on the rotational speed map M2 for the rack end mode. Then, the processes in steps S11, S24, S27, S13, S14 (rack end mode process) are executed. When the rack end mode process is being, executed, if the third mode switching condition is satisfied, an affirmative determination is made in step S24. Thus, the processes in steps S25 and S26 are executed, and then the target rotational speed setting unit 52 proceeds on to step S13. In this case, since an affirmative determination is made in step S13, the target rotational speed setting unit 52 proceeds on to step S14 in which the target rotational speed Vm* is set based on the rotational speed map M1 for the normal mode.

When the rack end mode process is being executed, if the fourth mode switching condition is satisfied, an affirmative determination is made in step S27. Thus, the processes in steps S28 to step S31 are executed, and then the target rotational speed setting unit 52 proceeds on to step S13. In this case, because a negative determination is made in step S13, the processes in step S19 to step S22 are executed. Thus, the target rotational speed X in the control mode switching period computed in step S19 is set as the target rotational speed Vm*. Then, when the first mode switching condition is not satisfied by the end of the control mode switching period, the processes in steps S11, S12, S13, and S19 to S22 are executed until the control mode itching period ends.

When the control mode switching period ends, an affirmative determination is made in step S21. Thus, the target rotational speed setting unit 52 proceeds from step S23 to step S14 in which the target rotational speed Vm* is set based on the rotational speed map M1 for the normal mode. Then, the processes in steps S11, S12, S13, S14 (normal mode process) are executed. The first mode switching condition used in step S12 in FIG. 6 may be the condition that the detected vehicle speed V is equal to or lower than the prescribed value α (α>0) and the absolute value |θh| of the detected steering angle is equal to or greater than the prescribed value β (β>0). In this case, steps S24 to S26 in FIG. 6 are omitted. When a negative determination is made in step S11, the target rotational speed setting unit 52 proceeds on to step S27.

Figure 7:
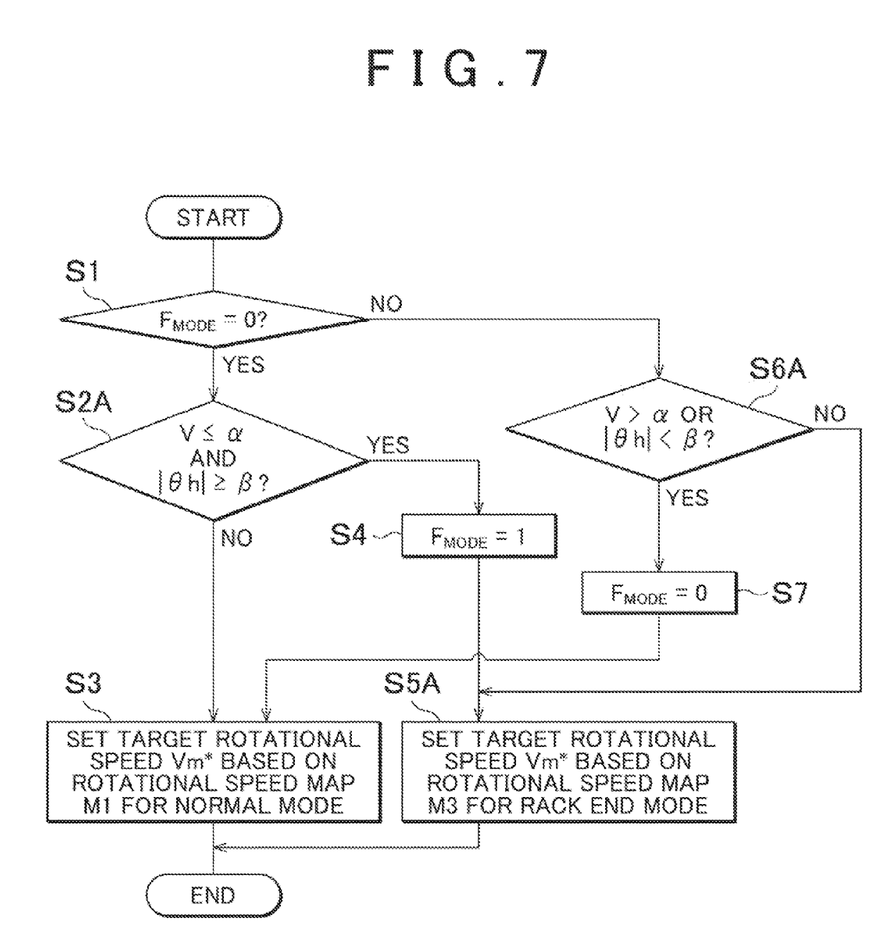
FIG. 7 is a flowchart illustrating still another example of the operation of the target rotational speed setting unit.

FIG. 7 is a flowchart illustrating still another example of the operation of the target rotational speed setting unit 52. The process in FIG. 7 is repeatedly executed with a prescribed computation period. The operation example in FIG. 7 is similar to the operation example in FIG. 5. In FIG. 7, the steps in which the same processes as those in the steps illustrated in FIG. 5 are executed are represented by the same reference symbols as those in FIG. 5.

In the operation example in FIG. 5, the condition relating to the steering angular velocity ωh is included in the first mode switching condition and the second mode switching condition. In contrast to this, in the operation example in FIG. 7, the condition relating to the steering angular velocity ωh is not included in these mode switching conditions. The rotational speed map M2 for the rack end mode used in the operation example in FIG. 5 is the map in which the target rotational speed Vm* with respect to the steering angle θh is stored. However, a rotational speed map M3 for the rack end mode used in the operation example in FIG. 7 is a map in which the target rotational speed Vm* with respect to the steering angle θh and the steering angular velocity ωh is stored. Therefore, in the operation example in FIG. 7, in the rack end mode, the target rotational speed Vm* is set based on the rotational speed map M3 for the rack end mode, the detected steering angle θh, and the detected steering angular velocity ωh.

Figure 8:
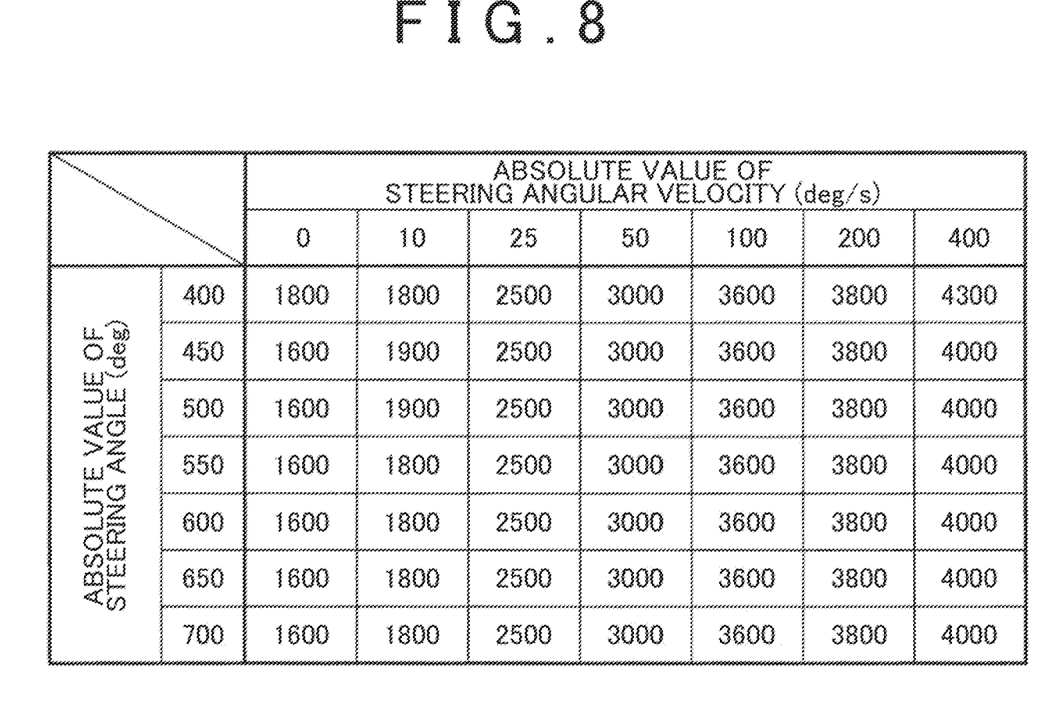
FIG. 8 is a table illustrating an example of the content of a rotational speed map M3 for the rack end mode.

FIG. 8 is a table illustrating an example of the content of the rotational speed map M3 for the rack end mode. The unit of the target rotational speed Vm* is rpm. The target rotational speeds Vm* between adjacent columns and adjacent rows in FIG. 8 are obtained by linear interpolation. As can be understood from FIG. 8, in the rack end mode, in principle, as the absolute value of the detected steering angle θh becomes larger, the target rotational speed Vm* is set to a lower value, and as the absolute value of the detected steering angular velocity ωh becomes larger, the target rotational speed Vm* is set to a larger value. In the rack end mode, when the steering angle is an angle formed when the rack 7a is closer to the rack end, the target rotational speed Vm* is set equal to or lower than the target rotational speed Vm* in the normal mode.

Therefore, even when the steering angular velocity abruptly increases while the steering wheel 3 is being returned from a steering angle that is formed when the rack 7a is positioned near the rack end, it is possible to restrain the target rotational speed Vm* for the electric motor 24 from abruptly changing to a large value due to the abrupt increase in the steering angular velocity. Thus, it is possible to suppress an increase in the degree of overshoot. As a result, it is possible to reduce operating noise of the hydraulic pump 22 at the time when the rack 7a is positioned near the rack end. Referring again to FIG. 7, the target rotational speed setting unit 52 determines whether the value of a mode flag FMODE is zero (step S1). The mode flag FMODE is a flag for storing the presently-set control mode. When the presently-set control mode is the normal mode, the value of the mode flag FMODE is set to zero. When the presently-set control mode is the rack end mode, the value of the mode flag FMODE is set to one. The initial value of the mode flag FMODE is zero.

When it is determined in step S1 that the value of the mode flag FMODE is zero, that is, when the control mode is the normal mode (step S1: YES), the target rotational speed setting unit 52 determines whether a first mode switching condition is satisfied (step S2A). The first mode switching condition is the condition that the detected vehicle speed V is equal to or lower than a prescribed value α to (α>0) and the absolute value |θh| of the detected steering angle is equal to or greater than a prescribed value β (β>0). The prescribed value α is set to, for example, a speed within a range of 1 km/h to 10 km/h. The prescribed value β is set to for example, an angle within a range of 400 degrees to the degree of the maximum steering angle.

When it is determined in step S2A that the first mode switching condition is not satisfied (step S2A: NO), the target rotational speed setting unit 52 sets the target rotational speed Vm* based on the rotational speed map M1 for the normal mode (see FIG. 3) (step S3). That is, the target rotational speed setting unit 52 sets the target rotational speed Vm* corresponding to the detected steering angular velocity ωh and the detected vehicle speed V, using the rotational speed map M1 for the normal mode. Then, the process in the present computation period ends.

When it is determined in step S2A that the first mode witching condition is satisfied (step S2A: YES), the target rotational speed setting unit 52 sets the value of the mode flag FMODE to one to switch the control mode from the normal mode to the rack end mode (step S4). Then, the target rotational speed setting unit 52 sets the target rotational speed Vm* based on the rotational speed map M3 for the rack end mode (see FIG. 8) (step S5A). That is, the target rotational speed setting unit 52 sets the target rotational speed Vm corresponding to the detected steering angle θh, using the rotational speed map M3 for the rack end mode. Then, the process in the present computation period ends.

When it is determined in step S1 that the value of the mode flag FMODE is one, that is, when it is determined that the control mode is the rack end mode (step S1: NO), the target rotational speed setting unit 52 determines whether a second mode switching condition is satisfied (step S6A). The second mode switching condition is the condition that the detected vehicle speed V is higher than the prescribed value α or the absolute value |θh| of the detected steering angle is less than the prescribed value β.

When it is determined in step S6A that the second mode switching condition is not satisfied (step S6A: NO), the target rotational speed setting unit 52 sets the target rotational speed Vm* based on the rotational speed map M3 for the rack end mode (see FIG. 8) (step S5A). Then, the process in the present computation period ends. When it is determined in step S6A that the second mode switching condition is satisfied (step S6A: YES), the target rotational speed setting unit 52 sets the value of the mode flag FMODE to zero to switch the control mode from the rack end mode to the normal mode (step S7). Then, the target rotational speed setting unit 52 sets the target rotational speed Vm* based on the rotational speed map M1 for the normal mode (see FIG. 3) (step S3). Then, the process in the present computation period ends.

When power is on, the processes in steps S1, S2A, S3 (normal mode process) are executed, and the target rotational speed Vm* is set based on the rotational speed map M1 for the normal mode. When the normal mode process is being executed, if the first mode switching condition is satisfied, an affirmative determination is made in step S2A. Thus, the value of the mode flag FMODE is set to one in step S4 then the target rotational speed setting unit 52 proceeds on to step S5A in which the target rotational speed Vm* is set based on the rotational speed map M3 for the rack end mode. Then, the processes in steps S1, S6A, S5A (rack end mode process) are executed.

When the rack end mode process is being executed, if the second mode switching condition is satisfied, an affirmative determination is made in step S6A. Thus, the value of the mode flag FMODE is set to zero in step S7, and then the target rotational speed setting unit 52 proceeds on to step S3 in which the target rotational speed Vm* is set based on the rotational speed map M1 for the normal mode. Then, the processes in steps S1, S2A, S3 (normal mode process) are executed.

Figure 9:
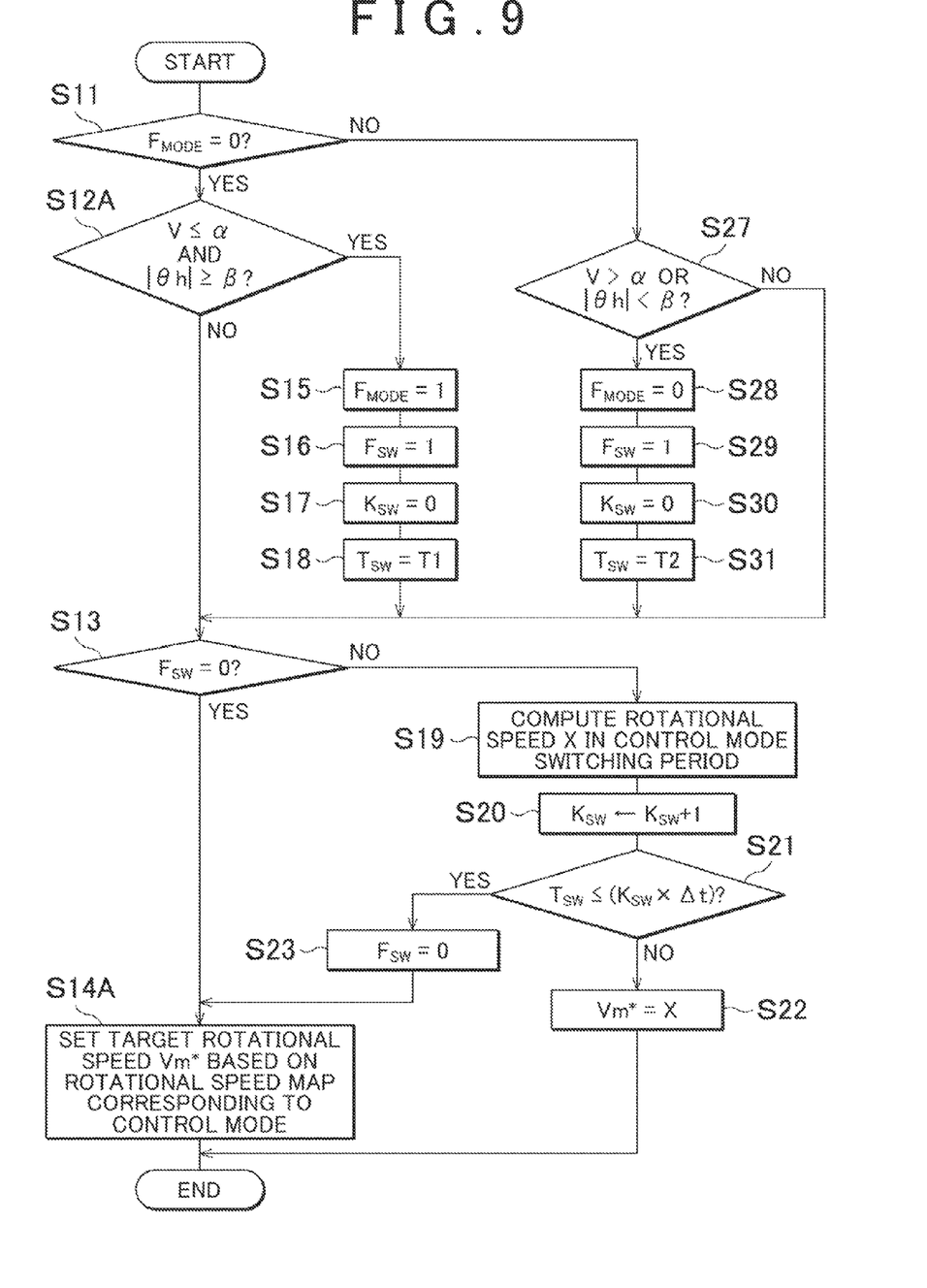
FIG. 9 is a flowchart illustrating still another example of the operation of the target rotational speed setting unit.

FIG. 9 is a flowchart illustrating still another example of the operation of the target rotational speed setting unit 52. The process in FIG. 9 is repeatedly executed with a prescribed computation period. The operation example in FIG. 9 is similar to the operation example in FIG. 6. In FIG. 9, the steps in which the same processes as those in the steps illustrated in FIG. 6 are executed are represented by the same reference symbols as those in FIG. 6.

The operation example in FIG. 9 is different from the operation example in FIG. 6 in that the condition relating to the steering angular velocity ωh is not included in the first mode switching condition and the rotational speed map for the rack end mode used in the operation example in FIG. 9 is the rotational speed map M3 illustrated in FIG. 8. The target rotational speed setting unit 52 determines whether the value of a mode flag FMODE is zero (step S1). The mode flag FMODE is a flag for storing the presently-set control mode. When the presently-set control mode is the normal mode, the value of the mode flag FMODE is set to zero. When the presently-set control mode is the rack end mode, the value of the mode flag. FMODE is set to one. The initial value of the mode flag FMODE is zero.

When it is determined in step S11 that the value of the mode flag FMODE is zero, that is, when the control mode is the normal mode (step S11: YES), the target rotational speed setting unit 52 determines whether a first mode switching condition is satisfied (step S12A). The first mode switching condition is the condition that the detected vehicle speed V is equal to or lower than a prescribed value α (α>0) and the absolute value |θh| of the detected steering angle is equal to or greater than a prescribed value β (β>0).

When it is determined in step S12A that the first mode switching condition is not satisfied (step S12A: NO), the target rotational speed setting unit 52 determines whether the switching period flag FSW is reset (FSW=0) (step S13). The switching period flag FSW is a Flag for storing the information as to whether the present time is in the control mode switching period. The switching period flag FSW is reset (FSW=0) when the present time is not in the control mode switching period, and is set (FSW=1) when the present time is in the control mode switching period. The switching period flag FSW is reset in the initial state.

When the switching period flag FSW is reset (FSW=0) (step S13: the target rotational speed setting unit 52 proceeds on to step S14A. In step S14A, the target rotational speed setting unit 52 sets the target rotational speed Vm* using the rotational speed map corresponding to the presently-set control mode. Specifically, when the value of the mode flag FMODE is zero (normal mode), the target rotational speed setting unit 52 sets the target rotational speed Vm* based on the rotational speed map M1 for the normal mode (see FIG. 3). That is, the target rotational speed setting unit 52 sets the target rotational speed Vm* corresponding to the detected steering angular velocity ωh and the detected vehicle speed V, using the rotational speed map M1 for the normal mode.

When the value of the mode flag FMODE is one (rack end mode), the target rotational speed setting unit 52 sets the target rotational speed Vm* based on the rotational speed map M3 for the rack end mode (see FIG. 8). The target rotational speed setting unit 52 sets the target rotational speed Vm* corresponding to the detected steering angle θh and the detected steering angular velocity ωh, using the rotational speed map M3 for the rack end mode. After the process in step S14A is executed, the target rotational speed setting unit 52 ends the process in the present computation period.

When it is determined in step S12A that the first mode switching condition is satisfied (step S12A: YES), the target rotational speed setting unit 52 sets the value of the mode flag FMODE to one to switch the control mode from the normal mode to the rack end mode (step S15). The target rotational speed setting unit 52 sets the switching period flag FSW (FSW=1) (step S16). The target rotational speed setting unit 52 sets the variable KSW, which is used as the elapsed time measurement counter for measuring the elapsed time in the control mode switching period, to zero (step S17). The target rotational speed setting unit 52 sets the first prescribed time T1 as the variable TSW for storing the control mode switching period (step S18). The first prescribed time T1 is set to, for example, a time within a range of 100 msec to 1000 msec. The target rotational speed setting unit 52 proceeds on to step S13 to determine whether the switching period flag FSW is reset (FSW=0).

In this case, because the switching period flag FSW is set (FSW=1), the target rotational speed setting unit 52 proceeds from step S13 to step S19. In step S19, the target rotational speed setting unit 52 computes the target rotational speed X in the control mode switching period. The target rotational speed X in the control mode switching period is computed according to Expression (1) described above. The target rotational speed setting unit 52 increments the count value KSW of the elapsed time measurement counter by one (step S20). Then, the target rotational speed setting, unit 52 determines whether the elapsed time KSW·Δt after the start of the control mode switching period is equal to or longer than the set value TSW of the control mode switching period (step S21). When the elapsed time KSW·Δt is shorter than the set value TSW of the control mode switching period (step S21: NO), the target rotational speed setting unit 52 determines that the control mode switching period has not ended and sets the target rotational speed X in the control mode switching period computed in step S19 as the target rotational speed Vm* (step S22). Then, the process m the present computation period ends.

When it is determined in step S21 that the elapsed time KSW·Δt is equal to or longer than the set value TSW of the control mode switch Mg period (step S21: YES), the target rotational speed setting unit 52 determines that the control mode switching period has ended and resets the switching period flag FSW (FSW=0) (step S23). Then, the target rotational speed setting unit 52 proceeds on to step S14A to set the target rotational speed Vm* based on the rotational speed map corresponding to the presently-set control mode. Then, the process in the present computation period ends.

When it is determined, in step S11 that the value of the mode flag FMODE is one, that is, when it is determined that the control mode is the rack end mode (step S11: NO), the target rotational speed setting unit 52 determines whether a fourth mode switching condition is satisfied (step S27). The fourth mode switching condition is the condition that the detected vehicle speed V is higher than a prescribed value α or the absolute value |θh| of the detected steering angle is less than a prescribed value β. When the fourth mode switching condition is not satisfied (step S27: NO), the target rotational speed setting unit 52 proceeds on to step S13.

When it is determined in step S27 that the fourth mode switching condition is satisfied (step S27: YES), the target rotational speed setting unit 52 sets the value of the mode flag FMODE to zero to switch the control mode from the rack end mode to the normal mode (step S28). The target rotational speed setting unit 52 sets the switching period flag FSW (FSW=1) (step S29). The target rotational speed setting unit 52 sets the variable KSW, which is used as the elapsed time measurement counter for measuring the elapsed time in the control mode switching period, to zero (step S30). The target rotational speed setting unit 52 sets the second prescribed time T2 as the variable TSW for storing the control mode switching period (step S31). The second prescribed time T2 is set to, for example, a time within a range of 100 msec to 1000 msec. The target rotational speed setting unit 52 proceeds on to step S13 to determine whether the switching period flag FSW is reset (FSW=0). In this case, because the switching period flag FSW is set (FSW=1), the target rotational speed setting unit 52 proceeds from step S13 to step S19.

When power is on, the processes in steps S11, S12A, S13, S14A (normal mode process) are executed, and thus the target rotational speed Vm* is set based on the rotational speed map M1 for the normal mode. When the normal mode process is being executed, if the first mode switching condition is satisfied, an affirmative determination is made in step S12A. Thus, the processes in steps S15 to S18 are executed, and then the target rotational speed setting unit 52 proceeds on to step S13. In this case, because a negative determination is made in step S13, the processes in steps S19 to S22 are executed. Thus, the target rotational speed X in the control mode switching period computed in step S19 is set as the target rotational speed Vm*. Then, if the fourth mode switching condition is not satisfied by the end of the control mode switching period, the processes in steps S11, S27, S13, and S19 to S22 are executed until the control mode switching period ends.

When the control mode switching period ends, an affirmative determination is made in step S21. Thus, the target rotational speed setting unit 52 proceeds from step S23 to step S14A in which the target rotational speed Vm* is set based on the rotational speed map M3 for the rack end mode. Then, the processes in steps S11, S27, S13, S14A (rack end mode process) are executed. When the rack end mode process is being executed, if the fourth mode switching condition is satisfied, an affirmative determination is made in Step S27. Thus, the processes in steps S28 to S31 are executed, and then the target rotational speed setting unit 52 proceeds on to step S13, in this case, because a negative determination is made in step S13, the processes in steps S19 to S22 are executed. Thus, the target rotational speed X in the control mode switching period computed in step S19 is set as the target rotational speed Vm*. Then, if the first mode switching condition is not satisfied by the end of the control mode switching period, the processes in steps S11, S12A, S13, and S19 to S22 are executed until the control mode switching period ends.

When the control mode switching period ends, an affirmative determination is made in step S21. Thus, the target rotational speed setting unit 52 proceeds from step S23 to step S14A in which the target rotational speed Vm* is set based on the rotational speed map M1 for the normal mode. Then, the processes in steps S11, S12A, S13, S14A (normal mode process) are executed.

What is claimed is:

1. A power steering system comprising:
   an electric motor;
   a hydraulic pump that is driven by the electric motor to generate steering assist force; and
   a controller that controls the electric motor,
   the controller being configured to
   (i) operate in a first mode that controls a rotational speed of the electric motor based on a steering angular velocity and a vehicle speed,
   (ii) operate in a second mode that controls the rotational speed of the electric motor based on a steering angle, wherein a target rotational speed in the second mode varies based on the steering angle, and
   (iii) switch a control mode from rotational speed control by the first mode to rotational speed control by the second mode when the vehicle speed is equal to or less than a first threshold and an absolute value of the steering angle is equal to or greater than a second threshold.

2. The power steering system according to claim 1, wherein, in the second mode, the controller is configured to control the rotational speed of the electric motor based on the steering angle and the steering angular velocity.

3. The power steering system according to claim 1, wherein the controller is configured to switch the control mode from the rotational speed control by the first mode to the rotational speed control by the second mode when the vehicle speed is equal to or less than the first threshold, the absolute value of the steering angle is equal to or greater than the second threshold, and an absolute value of the steering angular velocity is equal to or less than a third threshold.

4. The power steering system according to claim 2, wherein the controller is configured to switch the control mode from the rotational speed control by the first mode to the rotational speed control by the second mode when the vehicle speed is equal to or less than the first threshold, the absolute value of the steering angle is equal to or greater than the second threshold, and an absolute value of the steering angular velocity is equal to or less than a third threshold.

* * * * *